United States Patent [19]

Jost et al.

[11] 4,431,721
[45] Feb. 14, 1984

[54] USE OF PERYLENE PIGMENTS FOR PHOTOELECTROPHORETIC IMAGING

[75] Inventors: Max Jost, Oberwil; Werner Sieber, Basel, both of Switzerland

[73] Assignee: Ciba-Geigy Corporation, Ardsley, N.Y.

[21] Appl. No.: 390,467

[22] Filed: Jun. 21, 1982

[30] Foreign Application Priority Data

Jun. 29, 1981 [CH] Switzerland ......................... 4273/81

[51] Int. Cl.$^3$ ............................................. G03G 13/22
[52] U.S. Cl. ....................................... 430/37; 430/73; 430/76
[58] Field of Search ....................... 430/76, 73, 32, 37

[56] References Cited

U.S. PATENT DOCUMENTS

| | | | |
|---|---|---|---|
| 3,383,993 | 5/1968 | Yeh ........................................ | 430/37 |
| 3,546,085 | 12/1970 | Weinberger et al. ................. | 430/37 |
| 3,560,360 | 2/1971 | Carriera et al. ..................... | 204/181 |
| 3,871,882 | 3/1975 | Wiedemann .......................... | 430/59 |
| 3,904,407 | 9/1975 | Regensburger et al. ............. | 430/58 |
| 3,922,169 | 11/1975 | Bergfjord et al. .................... | 430/37 |

FOREIGN PATENT DOCUMENTS 2350923 10/1973 Fed. Rep. of Germany .

Primary Examiner—John D. Welsh
Attorney, Agent, or Firm—Harry Falber

[57] ABSTRACT

A photoelectrophoretic imaging process, wherein a suspension of photosensitive pigment particles between two electrodes, at least one of which is transparent, is subjected to the influence of an electric field and exposed to an image, which process comprises using, as photosensitive pigment, a perylenetetracarboxylic acid diimide of the formula

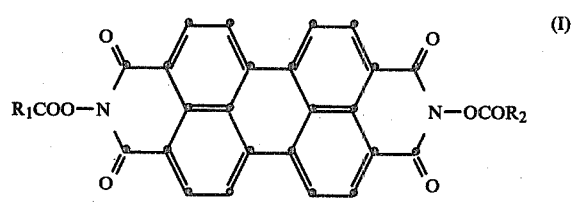

(I)

wherein $R_1$ and $R_2$ are aliphatic, cycloaliphatic, aromatic or heterocyclic radicals.

The pigments used in this invention are distinguished by particularly good photoelectrophoretic sensitivity and low fog density.

6 Claims, No Drawings

USE OF PERYLENE PIGMENTS FOR PHOTOELECTROPHORETIC IMAGING

It is known that photoelectrophoretic imaging processes constitute a subclass of electrophotographical reproduction processes. They can be used for reproducing monochrome or multicolour half-tone or line image originals. Photoelectrophoretic imaging processes are described e.g. in U.S. Pat. Nos. 3,384,565, 3,384,566 and 3,385,480. A feature common to all photoelectrophoretic processes is the use of particulate material which acts simultaneously as recipient of the electromagnetic radiation that imparts the image information, and as medium for the image fixed on the final support. The particles must therefore simultaneously be electrically photosensitive and have a surface colour suitable for imaging. When reducing the principle of photoelectrophoresis to actual practice, the procedure normally comprises suspending pigment particles, i.e. insoluble light-absorbing particles, in an electrically insulating carrier vehicle, desirably an aliphatic hydrocarbon. This suspension is applied between two electrodes, one of which may be transparent. An electrical voltage is applied to the electrodes, so that the pigment particles are subjected to the influence of an electric field. In certain embodiments of the process, the electric field can also be produced or modified by a corona discharge. In addition, an alternating field may be superimposed on the time-constant field. The suspension can then be irradiated—e.g. through the transparent electrode—by exposure to the activating radiation carrying the image information. Irradiation may also be effected in certain cases shortly before the electric field is applied. The particles then exhibit their electrical photosensitivity by depositing on one or other of the electrodes, depending on the intensity of the radiated light. The result is that a positive image is formed on one electrode and a negative image is formed on the other.

Ideally, all the particles deposit in the dark on one electrode, so that the electrode opposite, which throughout this specification is referred to as the "image electrode," has a deposit of pigment only in those areas where it has been irradiated. If this condition is not fulfilled, then the image is more or less densely fogged, i.e. it has a blurred background.

The distinct particle deposit described above can be promoted by means of so-called charge control agents, e.g. as described in U.S. Pat. No. 4,219,614 (Frederick A. Staley, Eastman Kodak Company). These charge control agents have often been selected from liquid toner systems of electrostatic copying processes. They usually consist of molecules which contain a readily ionisable part and a part which is readily compatible (i.e. non-polar) with the suspension vehicle. Very suitable charge control agents are the calcium petroleum sulfonates which are available e.g. from Orogil S.A. (France) under the registered trademark OLOA 246F ®. These compounds are calcium salts of aromatic sulfonic acids having a long linear hydrocarbon chain. The molecular weight is about 1000. The charge control agents often simultaneously act as dispersants, e.g. they cause an improvement in the spatial distribution of the pigment particles in the suspension. This property has in turn a positive influence on the resolution of the reproduction process. A further improvement in the state of the dispersion as well as fixation of the pigment particles on the image carrier after evaporation of the suspension vehicle, may be obtained with polymeric additives which are soluble in the suspension vehicle. As examples there may be mentioned poly-(12-hydroxystearic acid), polyisobutylene, dodecyl polymethacrylate, octadecyl polymethacrylate and polyvinyl toluene.

As reference value for the photoelectrophoretic sensitivity of a reproduction system there may be chosen e.g. the minimum light intensity required to obtain a specific density of pigment particles on the image electrode. Ideally this light intensity is as small as possible, whereas on the other hand, as already mentioned, no particles should deposit on the image electrode without irradiation.

Up to now, few magenta or red pigments are known that meet the aforementioned requirements even approximately and which at the same time have a pure shade, high tinctorial strength and lightfastness. The greatest shortcoming of the magenta or red pigments of the prior art, however, is that, in the absence of a charge control agent, they result in heavily flocculated suspensions and cause a dense fog on the image electrode, and that, in the presence of a charge control agent, they are greatly impaired in their photoelectrophoretic sensitivity. Systems which contain the pigments described below of this invention are distinguished by particularly good photoelectrophoretic sensitivity and low fog density. The perylenetetracarboxylic acid bis-phenylimides used as photoelectrophoretic toners in accordance with G.B. patent specification No. 1,155,974 have the disadvantage of a dull shade.

Accordingly, the present invention relates to a photoelectrophoretic imaging process, wherein a suspension of photosensitive pigment particles between two electrodes, at least one of which is transparent, is subjected to the influence of an electric field and exposed to an image, which process comprises using, as photosensitive pigment, a perylenetetracarboxylic acid diimide of the formula

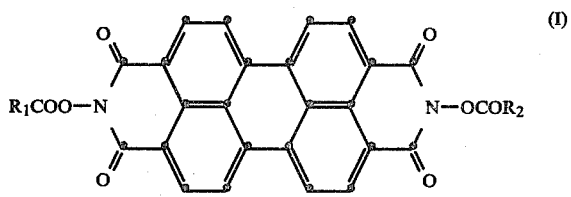

(I)

wherein $R_1$ and $R_2$ are aliphatic, cycloaliphatic, aromatic or heterocyclic radicals.

Aliphatic radicals $R_1$ and $R_2$ in the compound of formula I are preferably $C_1$–$C_4$alkyl radicals, e.g. methyl, ethyl, n-propyl, isopropyl or n-butyl groups. A cycloaliphatic radical is in particular the cyclohexyl radical. Aromatic radicals may be phenyl or naphthyl radicals and heterocyclic radicals may be thiophene or pyridine radicals.

Preferred compounds of the formula I are those in which the radicals $R_1$ and $R_2$ are identical and are a radical of the formula

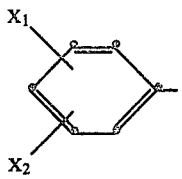

wherein $X_1$ is hydrogen, halogen, $C_1$–$C_4$alkyl or $C_1$–$C_4$alkoxy and $X_2$ is hydrogen, halogen or $C_1$–$C_2$alkyl; and in particular those in which $R_1$ and $R_2$ are a radical of the formula

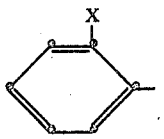

wherein X is fluorine, chlorine, bromine, methyl or ethyl.

The pigments preferably have an average particle size of 0.01 to 5μ, most preferably from 0.05 to 0.2μ.

The invention is illustrated by the following Examples, in which parts and percentages are by weight unless otherwise indicated.

EXAMPLE 1

8 parts of N,N'-bis-(2-chlorobenzoyloxy)perylenetetracarboxylic acid diimide (compound of the formula I, $R_1=R_2=$o-chlorobenzoyl) are ground in 92 parts of Isopar G ® (mixture of branched aliphatic hydrocarbons available from Essochem) for 4 hours in a laboratory sand mill. The pigment concentration of the suspension is then adjusted to 4.8%.

2.5 parts of this 4.8% pigment suspension, 4 parts of a 1% solution of OLOA 246F ® (available from OROGIL, France) in Isopar G ® and 13.5 parts of Isopar G are mixed using an ultrasonic rod and then kept in the absence of light.

The pigment suspension is tested in an exposure apparatus consisting of two transparent, parallel Nesa glass electrodes spaced 0.1 mm apart. The electrode surface is 10 cm² and the electric voltage applied is 875 volts. The cell is exposed using a projector provided with a halogen lamp. The exposure times are adjusted with a control shutter. After exposure and separation of the electrodes, the optical density on the electrode opposite to the incidence of light is measured with a spectrophotometer at the maximum absorption of the toner. The optical density which is measured on the plate without prior exposure is referred to hereinafter as "fog density," and the optical density measured after exposure is referred to as the "image density." The results are reported in the following table:

| Exposure: | Optical density: |
|---|---|
| 0 (fog) | 0.0055 |
| 110 luxsec | 0.1035 |
| 1722 luxsec | 0.3103 |

EXAMPLE 2

3.5 parts of compound of the formula I, $R_1=R_2=$o-chlorobenzoyl, 20 parts of a 1% solution of OLOA 246F in Isopar G and 26,5 parts of Isopar G are ground with steatite balls for 72 hours in a laboratory ball mill. 3.4 parts of the resultant suspension, 1.2 parts of a 1% solution of OLOA 246F in Isopar G, 10 parts of a 6% solution of poly(12-hydroxy-stearic acid) and 5.4 parts of Isopar G are mixed using an ultrasonic rod and kept in the absence of light.

The above toner suspension is tested as in Example 1, but applying a voltage of 1050 volts. The results are reported in the following table:

| Exposure: | Optical density: |
|---|---|
| 0 (fog) | 0.0058 |
| 74 luxsec | 0.054 |
| 144 luxsec | 0.201 |
| 4000 luxsec | 0.855 |

EXAMPLE 3

12 g of compound of the formula I $R_1=R_2=$o-chlorobenzoyl in 220 ml dimethyl formamide are heated for 26 hours to 100° C. (bath temperature). The pigment is then centrifuged off, washed twice with toluene and dried. 3.5 parts of the treated pigment are ground in 46.5 parts of Isopar G with steatite balls for 72 hours in a sealable glass container. 6.8 parts of the resultant suspension, 6 parts of a 1% solution of OLOA 246F in Isopar G, 13.3 parts of a 6% solution of poly(12-hydroxystearic acid) and 23.9 parts of Isopar G are mixed under ultrasonic irradiation and the mixture is kept in the absence of light. The toner suspension so obtained is tested in an imaging system consisting substantially of a horizontal, planar Nexa glass electrode and a steel roller coated with paper. The roller moves over the plate covered with the suspension while the plate is exposed from below to an image. In this instance, exposure is made through a neutral grey step wedge from below onto the transparent electrode, while a d/c voltage of 700 volts is applied between the plate and the roller. The image reproduction formed on the paper is evaluated by reflectance densitometry, resulting in a fog density of 0.02, a sensitivity of 4.6 luxsec and a maximum image density of over 0.5. The slope of the characteristic curve is about 0.4.

EXAMPLE 4

The toner dispersion described in Example 3 is tested by the same method as employed therein, except that a KODACOLOR ® coloured negative is projected onto the transparent electrode through a Kodak Wratten ® 58 filter. First the yellow component is applied using another toner, then, after cleaning the roller and drying the image, the magenta component is applied using the toner dispersion of the invention, and subsequently the cyan component is applied in the same manner using a β-copper phthalocyanine toner. A polychromatic positive image of good natural colours and good half-tone reproduction is obtained.

EXAMPLE 5

(prior art)

8 parts of C.I. Pigment Red 23 in 92 parts of Isopar G are ground for 6 hours in a laboratory sand mill. The pigment concentration is then adjusted to 6%. 2 parts of this 6% pigment suspension, 3 parts of a 1% solution of OLOA 246F and 15 parts of Isopar G are mixed under ultrasonic irradiation. The toner dispersion so obtained is tested as in Example 1. The electric voltage applied is 1050 volts. The results are reported in the following table (average values and standard deviations from 4 measurements in each case):

| Exposure: | Optical density: |
|---|---|
| 0 (fog) | 0.0025 ± 0.0017 |
| 2886 luxsec | 0.0035 ± 0.0006 |
| 85760 luxsec | 0.0045 ± 0.0006 |

EXAMPLE 6
(prior art)

2-Methylquinacridone is purified by repeated extraction with carbon tetrachloride and then dried. 3.5 parts of the purified pigment in 46.5 parts of Isopar G are ground with steatite balls for 72 hours in a ball mill. 1.7 parts of the resultant suspension, 1.5 parts of a 1% solution of OLOA 246F and 16.8 parts of Isopar G are mixed under ultrasonic irradiation. The toner suspension so obtained is tested as in Example 1 applying a current of 875 volts. The results are reported in the following table:

| Exposure: | Optical density: |
|---|---|
| 0 (fog) | 0.092 ± 0.015 |
| 2886 luxsec | 0.191 ± 0.024 |
| 19776 luxsec | 0.250 ± 0.027 |

EXAMPLE 7
(prior art)

3.5 parts of methylquinacridone, 30 parts of a 1% solution of OLOA 246F in Isopar G and 16.5 parts of Isopar G are ground for 72 hours in a laboratory ball mill. 1.7 parts of the resultant suspension, 1 part of a 1% solution of OLOA 246F and 17.3 parts of Isopar G are mixed under ultrasonic irradiation. The toner dispersion so obtained is tested as in Example 1. The results are reported in the following table:

| Exposure: | Optical density: |
|---|---|
| 0 (fog) | 0.0155 ± 0.0013 |
| 2886 luxsec | 0.0390 ± 0.0016 |
| 19776 luxsec | 0.0500 ± 0.0022 |

What is claimed is:

1. In a photoelectrophoretic imaging process, wherein a liquid suspension of photosensitive pigment particles between two electrodes, at least one of which is transparent, is subjected to the influence of an electric field and exposed to an image, the improvement which comprises using, as photosensitive pigment, an effective photosensitive amount of a perylenetetracarboxylic acid diimide of the formula

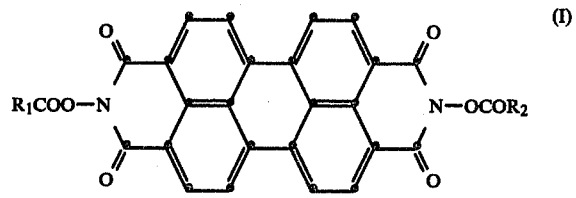

wherein $R_1$ and $R_2$ are aliphatic, cycloaliphatic, aromatic or heterocyclic radicals.

2. A process according to claim 1, wherein $R_1$ and $R_2$ are radicals of the formula

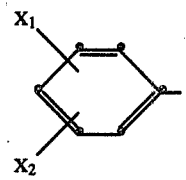

in which $X_1$ is hydrogen, halogen, $C_1$-$C_4$alkyl or $C_1$-$C_4$alkoxy, and $X_2$ is hydrogen, halogen or $C_1$-$C_2$alkyl.

3. A process according to claim 1, wherein $R_1$ and $R_2$ are radicals of the formula

wherein X is fluorine, chlorine, bromine, methyl or ethyl.

4. A process according to claim 1, wherein the calcium salt of an aromatic sulfonic acid containing a long chain linear hydrocarbon radical in the aromatic moiety is added as a charge control agent.

5. A process according to claim 1, wherein poly(12-hydroxystearic acid) is added to said liquid suspension.

6. A process according to claim 1, wherein the pigment has a particle size of 0.01 to 5μ.

* * * * *